(No Model.)

B. OLBRICHT.
TROLLEY FOR CONDUIT RAILWAYS.

No. 486,985. Patented Nov. 29, 1892.

WITNESSES:
Marion Hall
Charles Schroeder

INVENTOR
B. Olbricht
BY Goepel & Raegener
ATTORNEYS.

THE NORRIS PETERS CO., PHOTO-LITHO., WASHINGTON, D. C.

UNITED STATES PATENT OFFICE.

BENJAMIN OLBRICHT, OF BROOKLYN, NEW YORK.

TROLLEY FOR CONDUIT-RAILWAYS.

SPECIFICATION forming part of Letters Patent No. 486,985, dated November 29, 1892.

Application filed May 17, 1892. Serial No. 433,288. (No model.)

*To all whom it may concern:*

Be it known that I, BENJAMIN OLBRICHT, a citizen of the United States, and a resident of the city of Brooklyn, in the county of Kings and State of New York, have invented certain new and useful Improvements in Underground Conduits for Electric Railways, of which the following is a specification.

This invention relates to an improved underground conduit for electric railways in which short-circuiting of the current by water is effectually prevented and the continuous contact of the trolley with the conducting-rails obtained; and the invention consists of an underground conduit formed of a closed box provided with a longitudinal slot in its top part, metallic conductors attached to the under side of the top, one at each side of the slot and insulated from the top, and a trolley that is suspended by a hinged and spring-actuated arm from a car composed of two rollers, one in contact with each of the conductors, each roller being provided with a swinging casing or box to prevent short-circuiting in case the water should rise up to the level of the trolley in the casing.

Figure 1:
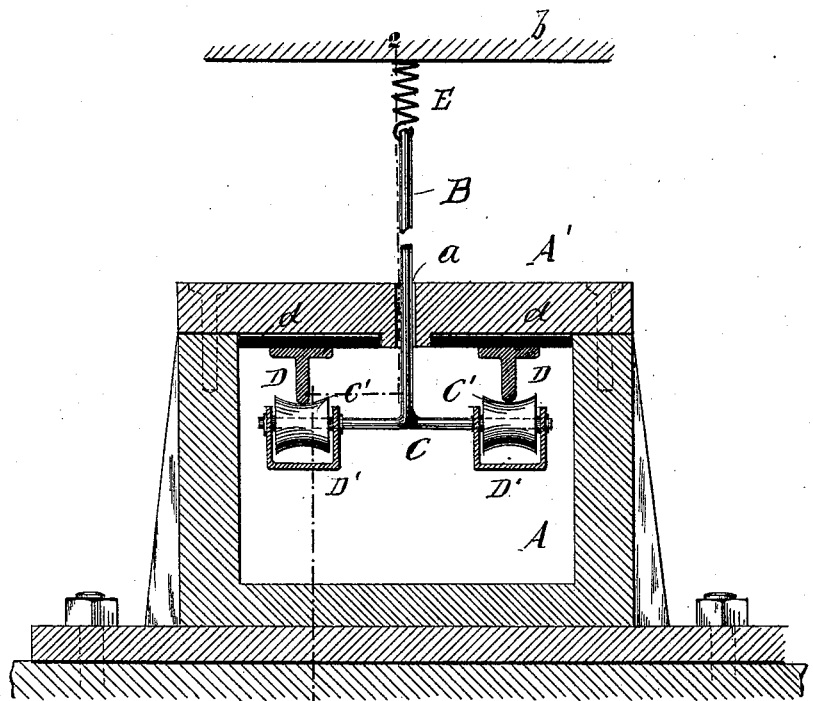
Figure 2:
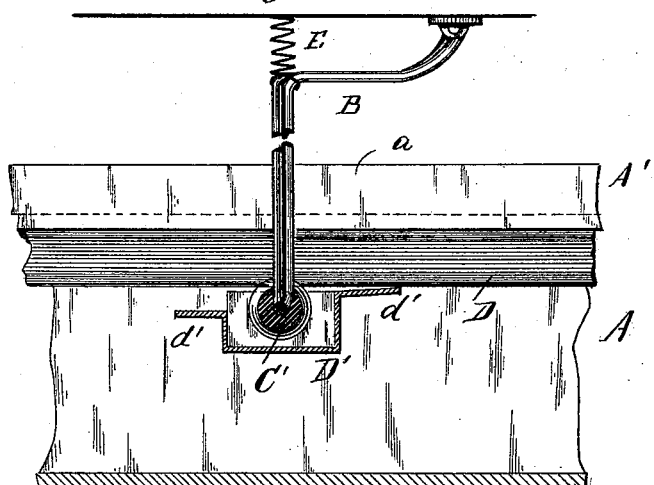

In the accompanying drawings, Figure 1 represents a vertical transverse section of my improved underground conduit for electric railways; and Fig. 2 is a vertical longitudinal section on line 2 2, Fig. 1.

Similar letters of reference indicate corresponding parts.

Referring to the drawings, A represents an underground conduit, which is preferably formed of a casing of oblong or other cross-section, said casing being preferably made of cast-iron, burnt clay, or other suitable material. The top plate A' of the casing is provided with a longitudinal slot $a$, through which the lever-arm B, that is hinged to the bottom of the car $b$ and suspended by suitable springs E from the same, is conducted to the inside of the casing, said arm carrying at its lower end, at the inside of the casing, a trolley C, the rollers C' of which form contact with metallic conductors D, that are attached to insulating-plates $d$, which latter are supported at the under side of the top plate A', as shown clearly in Fig. 1.

The metallic conductors D are preferably made T-shaped in cross-section, so as to diminish the area of the same as much as possible, the contact-rollers of the trolley C being preferably grooved, so as to form a reliable contact with the metallic conductors D. The hinged suspension-arm B serves as a support for the insulated conducting-wires, by which the current is conducted to the electric motor on the car, the current being conducted from the metallic conductors to the metallic rollers and along insulated wires of the arm.

The casing or conduit A is to be provided with the usual drainage-openings, so that any rain-water which collects in the same is readily drained off. In case, however, there should be a large accumulation of water in the conduit which might rise at some point so as to produce the short-circuiting of the current the rollers are provided with hanging boxes or casings D', which have at their front and rear ends projecting flanges or lips $d'$, that move along the conductors so as to protect the rollers and prevent the passing of any accumulated water to the same.

My improved underground conduit furnishes a regular and constant current without any loss by short-circuiting or sparking, the construction being comparatively simple and inexpensive.

Having thus described my invention, what I claim as new, and desire to secure by Letters Patent, is—

The combination, with a casing the top plate of which is provided with a longitudinal slot, of metallic conductors attached to the under side of the top plate, insulating-plates between the top plate and the conductors, a hinged and spring-actuated arm adapted to be suspended from a car and passing through the slot of the top plate, a trolley at the lower end of the arm, the rollers of which are in contact with the conductors, and protecting-casings suspended from the pivots of the rollers and provided with lips or flanges at the ends, substantially as set forth.

In testimony that I claim the foregoing as my invention I have signed my name in presence of two subscribing witnesses.

BENJAMIN OLBRICHT.

Witnesses:
PAUL GOEPEL,
MARION HALL.